United States Patent
Li et al.

(10) Patent No.: US 10,601,466 B2
(45) Date of Patent: Mar. 24, 2020

(54) SENSOR FOR SENSING USAGE STATUS OF ELECTRICAL DEVICE AND ASSOCIATED METHOD

(71) Applicant: Prolific Technology INC., Taipei (TW)

(72) Inventors: Yun-Guo Li, Hsinchu County (TW); Ke-Qiang Shen, Taipei (TW); Yen-Zhi Lin, Pingtung County (TW); Jia-Zhang Xu, Hsinchu County (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 0 days.

(21) Appl. No.: 15/468,480

(22) Filed: Mar. 24, 2017

(65) Prior Publication Data

US 2017/0278376 A1 Sep. 28, 2017

Related U.S. Application Data

(60) Provisional application No. 62/313,776, filed on Mar. 27, 2016.

(30) Foreign Application Priority Data

Dec. 14, 2016 (TW) .............................. 105141362 A

(51) Int. Cl.
*G08B 13/12* (2006.01)
*H04B 3/54* (2006.01)
*H04B 3/46* (2015.01)

(52) U.S. Cl.
CPC ................. *H04B 3/54* (2013.01); *H04B 3/46* (2013.01)

(58) Field of Classification Search
CPC ........ G08B 21/182; H01Q 1/50; H03H 11/30; H03H 7/40; H04B 1/0458; F21S 4/28;
(Continued)

(56) References Cited

U.S. PATENT DOCUMENTS 5,287,087 A * 2/1994 Jencks .................. H01F 7/1607
324/127
5,473,244 A * 12/1995 Libove ..................... G01R 1/22
324/126
(Continued)

FOREIGN PATENT DOCUMENTS

CN 1538183 A 10/2004
CN 101241147 A 8/2008
(Continued)

*Primary Examiner* — Daniel Previl
(74) *Attorney, Agent, or Firm* — WPAT, PC

(57) ABSTRACT

A sensor for sensing a usage status of an electrical device and its associated method are disclosed. The sensor is disposed at a near-end of a power line of the electrical device. The sensor provided with a magnetic detector, an analog-to-digital converter and a controller. The magnetic detector is close to the power line to detect a magnetic field change around the power line to correspondingly generate an analog signal. The analog-to-digital converter (ADC) is used to receive the analog signal and convert the analog signal to a digital signal. The controller is used to receive the digital signal and generate an indication signal to accordingly learn at least one of statuses of being turned on and turned off the electrical device.

15 Claims, 3 Drawing Sheets

(58) Field of Classification Search
CPC .. F21S 8/03; F21V 13/08; F21V 14/02; F21V 14/04; F21V 17/10; F21V 19/02; F21V 23/003; F21V 23/0442; F21V 23/0464; F21V 23/06
USPC ...... 340/652, 654, 660, 643, 825.61, 310.11, 340/310.17, 309.6, 319
See application file for complete search history.

(56) References Cited

U.S. PATENT DOCUMENTS

| | | | | |
|---|---|---|---|---|
| 6,483,309 B1 * | 11/2002 | Gripshover | ........ | G01R 29/0814 324/117 R |
| 6,956,489 B2 * | 10/2005 | Peck | ........ | G01N 17/00 340/640 |
| 7,193,832 B2 * | 3/2007 | Hasegawa | ........ | H01L 23/48 257/E23.01 |
| 2007/0024737 A1 * | 2/2007 | Nakamura | ........ | H04N 5/23293 348/335 |
| 2008/0191009 A1 * | 8/2008 | Gressel | ........ | H04L 63/108 235/382 |
| 2008/0231410 A1 * | 9/2008 | Doljack | ........ | H01H 9/168 337/206 |
| 2013/0211844 A1 * | 8/2013 | Sadwick | ........ | G08C 17/02 704/275 |
| 2014/0072060 A1 * | 3/2014 | Patel | ........ | G08B 25/06 375/257 |
| 2017/0102417 A1 * | 4/2017 | Juan | ........ | G01R 21/1331 |

FOREIGN PATENT DOCUMENTS

| | | |
|---|---|---|
| CN | 101484813 A | 7/2009 |
| CN | 102608383 A | 7/2012 |
| CN | 102830265 A | 12/2012 |
| CN | 103091535 A | 5/2013 |
| CN | 103439670 A | 12/2013 |
| CN | 103698656 A | 4/2014 |

* cited by examiner

SENSOR FOR SENSING USAGE STATUS OF ELECTRICAL DEVICE AND ASSOCIATED METHOD

CROSS REFERENCE TO RELATED PATENT APPLICATION

This patent application is based on U.S. provisional application No. 62/313,776 filed on Mar. 27, 2016; and this patent application also claims the foreign priority on the Taiwan, R.O.C. patent application No. 105141362 filed in Taiwan on Dec. 14, 2016, the entire contents of all of which are hereby incorporated by reference.

FIELD OF THE INVENTION

The present invention relates to a sensing technology, and more particularly, to a sensor for sensing a usage status of an electrical device and an associated method.

BACKGROUND OF THE INVENTION

To determine a usage status of an electrical device, e.g., whether the electrical device is turned on or turned off, an additional component needs to be provided on an electrical appliance or mechanical device that consumes electrical power. In a conventional solution that uses an ammeter or a power measuring equipment, an existing power line needs to disconnected, and the ammeter or power measuring equipment is then connected in series thereto. However, the above method not only involves complex application details but also impairs an existing wire, hence resulting limitations for a user. Further, if a clamp meter is adopted, the clamp meter cannot be readily used in a two-wire application. In order to use the two-wire, the two-wire power line needs to be separated, which is equivalently decomposing the power line, in a way that user may be less willing to use such approach. There are some other methods having issues of high costs.

SUMMARY OF THE INVENTION

The disclosure is directed to a sensor for sensing a usage status of an electrical device and an associated sensing method. The sensor and sensing method of the disclosure need not separate a multi-wire power line that may then stay intact, and is thus suitable for single-wire, two-wire or even three-phase power lines.

For achieving the above, the present invention provides a sensor for sensing a usage status of an electrical device disposed at a near-end of a power line of the electrical device. The sensor provided with a magnetic detector, an analog-to-digital converter and a controller. The magnetic detector is close to the power line to detect a magnetic field change around the power line to correspondingly generate an analog signal. The analog-to-digital converter (ADC) is used to receive the analog signal and convert the analog signal to a digital signal. The controller is used to receive the digital signal and generate an indication signal to accordingly learn at least one of statuses of being turned on and turned off the electrical device.

The present invention further provides a sensing method adapted for a sensor to sense a usage status of an electrical device. The sensor, disposed at a near-end of a power line of the electrical device, comprises a magnetic detector, an analog-to-digital converter (DAC) and a controller. The sensing method comprises the steps of: disposing the magnetic detector close to the power line to detect a magnetic field change around the power line and to accordingly generate an analog signal; receiving the analog signal and converting the analog signal to a digital signal by the ADC; and receiving the digital signal and generating an indication signal by the controller to according learn at least one of statuses of being turned on and turned off the electrical device.

In the sensor and sensing method for sensing a usage status of an electrical device according to the disclosure, a usage status, e.g., being turned on or turned off, of the electrical device may be determined without modifying original power lines of an electrical appliance or mechanical device. Further, involving no risks of damaging power lines or wires, the sensor and sensing method may be easily installed or performed by a user, and are thus suitable for single-wire, two-wire or even three-phase power lines.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENT

A sensor for sensing a usage status of an electrical device of the disclosure may be installed to a power line, or a wire through which a current passes, of an electrical device whose usage status is to be determined. A certain value of current is loaded when an electrical device is in use, and such load current produces a corresponding magnetic field. Thus, using a device with one or multiple elements that sense its magnetic field, a usage status of being turned on or turned off may be determined for that electrical device. Furthermore, regarding a value change in the load current, due to special current patterns of different electrical devices in use, special magnetic field changes are correspondingly generated. By determining these magnetic field changes in corresponding special patterns, the corresponding usage status of being turned on or turned off may be correctly determined. For example, an electrical appliance powered by an alternating current has a current load pattern of a sine wave, and this current in a sinusoidal pattern also produces corresponding magnetic field changes. Therefore, even in the presence of magnetic interference generated in an external environment, whether the alternating-current electrical appliance is in use may be confirmed through whether a sine wave is generated.

Figure 1:
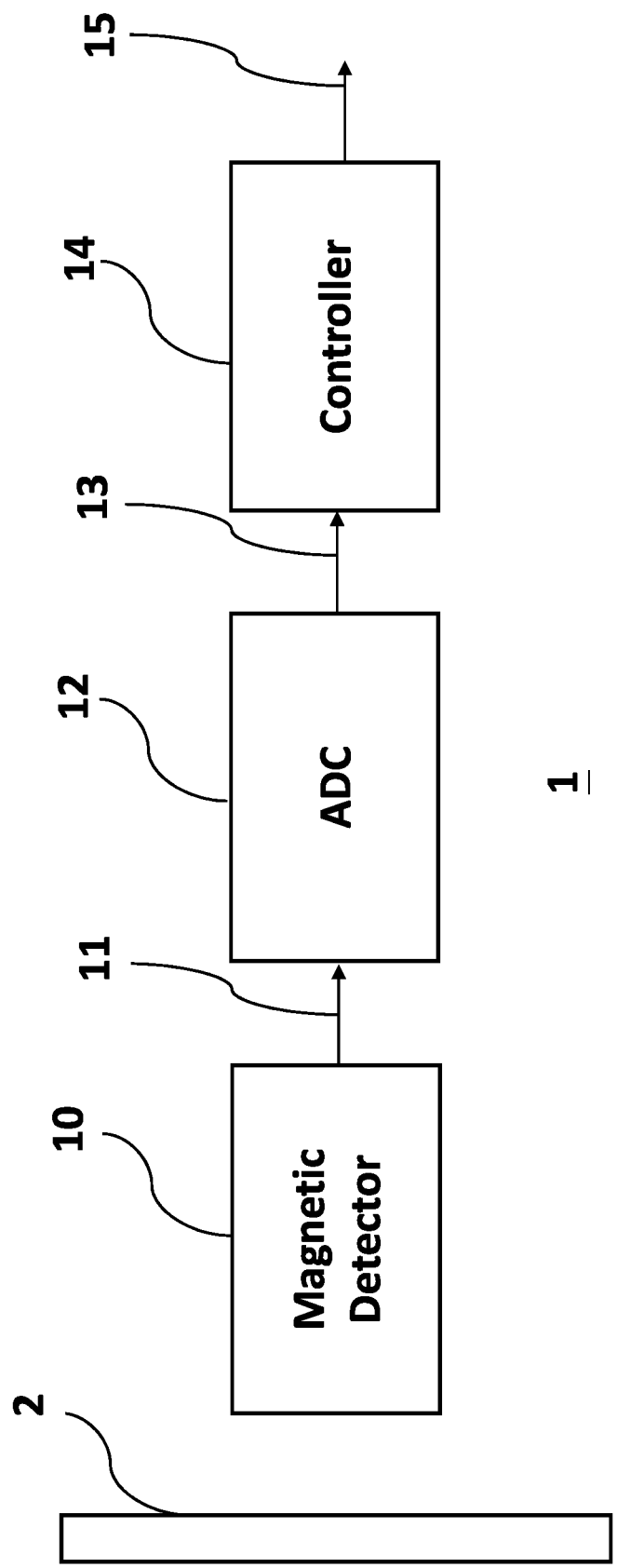
FIG. 1 is a block diagram of a sensor for sensing a usage status of an electrical device according to a preferred embodiment.
Figure 2:
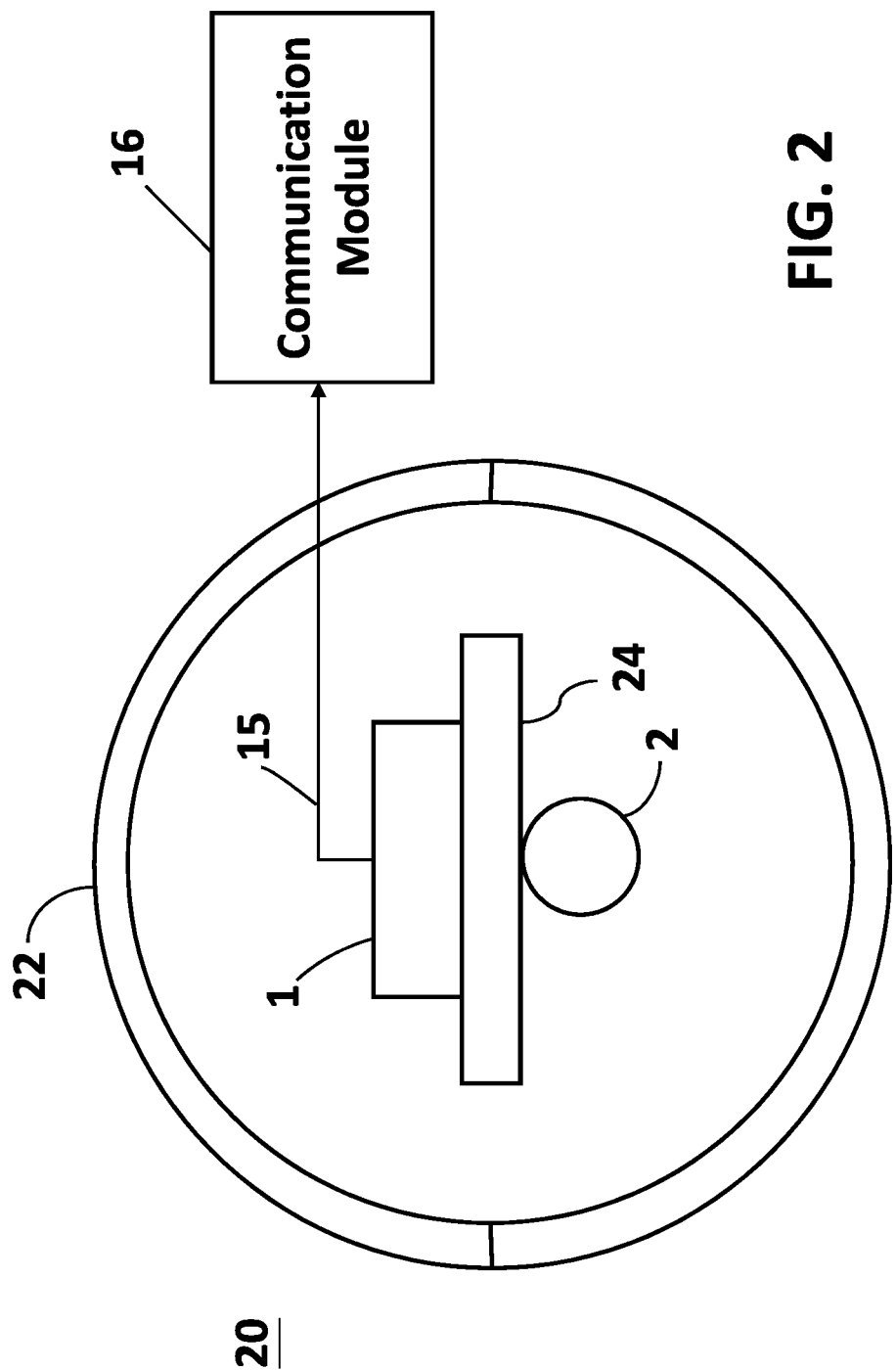
FIG. 2 is a section diagram of a sensor for sensing a usage status of an electrical device of the disclosure applied to a power line.

FIG. 1 shows a block diagram of a sensor for sensing a usage status of an electrical device according to a preferred embodiment of the disclosure. As shown, a sensor 1 for sensing a usage status of an electrical device of the disclosure is disposed close to a power line 2 of an electrical device under test. Preferably, the sensor 1 may be connected on the power line 2 of the electrical appliance in socketed manner (as shown in FIG. 2, to be described in detail shortly). A position for disposing the sensor 1 for sensing a usage status of an electrical device may be, for example but not limited to, close to a power socket end of the power line 2, close to a body end of the electrical device, or close to a center between the power socket end and the body end of the electrical device. The sensor 1 for sensing a usage status of an electrical device according to the disclosure is mainly for sensing magnetic field strength and/or changes induced by the current in the power line 2. Thus, given that the magnetic field strength and/or changes of any position of the power line can be sufficiently sensed, the position and method for disposing the sensor 1 do not pose limitations on the application scope of the sensor 1 for sensing a usage status of an electrical device according to the disclosure.

Again referring to FIG. 1, the sensor 1 for sensing a usage status of an electrical device according to the disclosure includes a magnetic detector 10, an analog-to-digital converter (ADC) 12 and a controller 14. The magnetic detector 10 detects a magnetic field strength or change inducted by the power line 2 under test. A result of the magnetic field strength sensed by the magnetic detector 10 may be outputted in form of an analog voltage or current signal 11. Preferably, the magnetic detector 10 may be formed by a magneto-impedance sensor, a magneto-resistance sensor, a giant magneto-resistance sensor or a Hall sensor. The ADC 12 receives the analog signal 11 outputted from the magnetic detector 10, and performs analog-to-digital conversion on the ADC signal 11 to output a corresponding digital signal 13 to the controller 14. A bit count of the resolution required by the ADC is determined according to an application situation and a required precision, and may be 8, 10, 12 or 16 bits. The controller 14 receives the digital signal 13 outputted from the ADC 12, and performs a control analysis on the digital signal 13 to output an indication signal that determines the usage status of the electrical device. In general, the controller is implemented by a microprocessor, which may be an 8-bit, 16-bit, 32-bit or 64-bit microprocessor, or even a microprocessor in a higher bit count.

FIG. 2 shows a section diagram of the sensor 1 for sensing a usage status of an electrical device of the disclosure disposed at a power line. As shown in FIG. 2, the sensor 1 for sensing a usage status of an electrical device of the disclosure is provided in form of a ferrite bead structure. A ferrite beads is a passive component for suppressing high-frequency signals in a circuit. Further, a ferrite bead is a special choke mostly made of ferrite, and suppresses high-frequency noises by heat dissipation generated from its high-frequency current. A ferrite bead is sometimes referred to as a magnetic ring, an EMI filter or an iron core. A simplest bead ferrite structure is a loop inductor of ferrite, and such magnetic ring in a clamp shape may be directly fastened on the power line 2. Other details of the ferrite structure are generally known to one person skilled in the art, and shall be omitted herein.

As shown in FIG. 2, the denotation 20 represents the magnetic ring, and the denotation 22 represents an anti-magnetic interference outer cover that may be formed by ferrite. The components (including the magnetic detector 10, the ADC 12 an the controller 14) of the sensor 1 for sensing a usage status of an electrical device shown in FIG. 1 are integrated and provided on a signal collection board 24, and both of the sensor 1 and the signal collection board 24 are placed close to the power line 2 of the electrical device. Alternatively, the sensor 1 may be embedded into the signal collection board 24, as shown in FIG. 2. The signal collection board 24 is usually formed by a high-permeability material, of which ferrite is one example. As previously described, the magnetic detector 10 in the sensor 1 for sensing a usage status of an electrical device needs to be placed close to the power line 2 as much as possible. In the application, the term "close to" refers to, for example but not limited to, means such as being attached, mounted or embedded.

Further, the sensor 1 for sensing a usage status of an electrical device of the disclosure and the power line 2 are both encircled in the magnetic ring 20, which is further covered by the anti-magnetic interference outer cover 22. Thus, the sensor 1 for sensing a usage status of an electrical device is enveloped, and external magnetic field interference is blocked by a shielding effect. As the ADC 12 or controller 14 in the sensor 1 for sensing a usage status of an electrical device of the disclosure processes digital signals and is less likely affected by electrical field or magnetic field interference, the ADC 12 or controller 14 may be alternatively placed outside the anti-magnetic interference outer cover 22. In FIG. 2, a communication module 16 is further depicted. The communication module 16 receives an indication signal 15 outputted from the controller 14 in the sensor 1. The indication signal 15 is processed by the communication module 16 and then transmitted for a backend data processing apparatus for further processing, analysis and/or control, such that the sensor for sensing a usage status of an electrical device of the disclosure may be more extensively applied. To ensure that the communication module 16 provides better transmission quality, preferably, the communication module 16 is disposed outside of the anti-magnetic interference outer cover 22.

Figure 3:
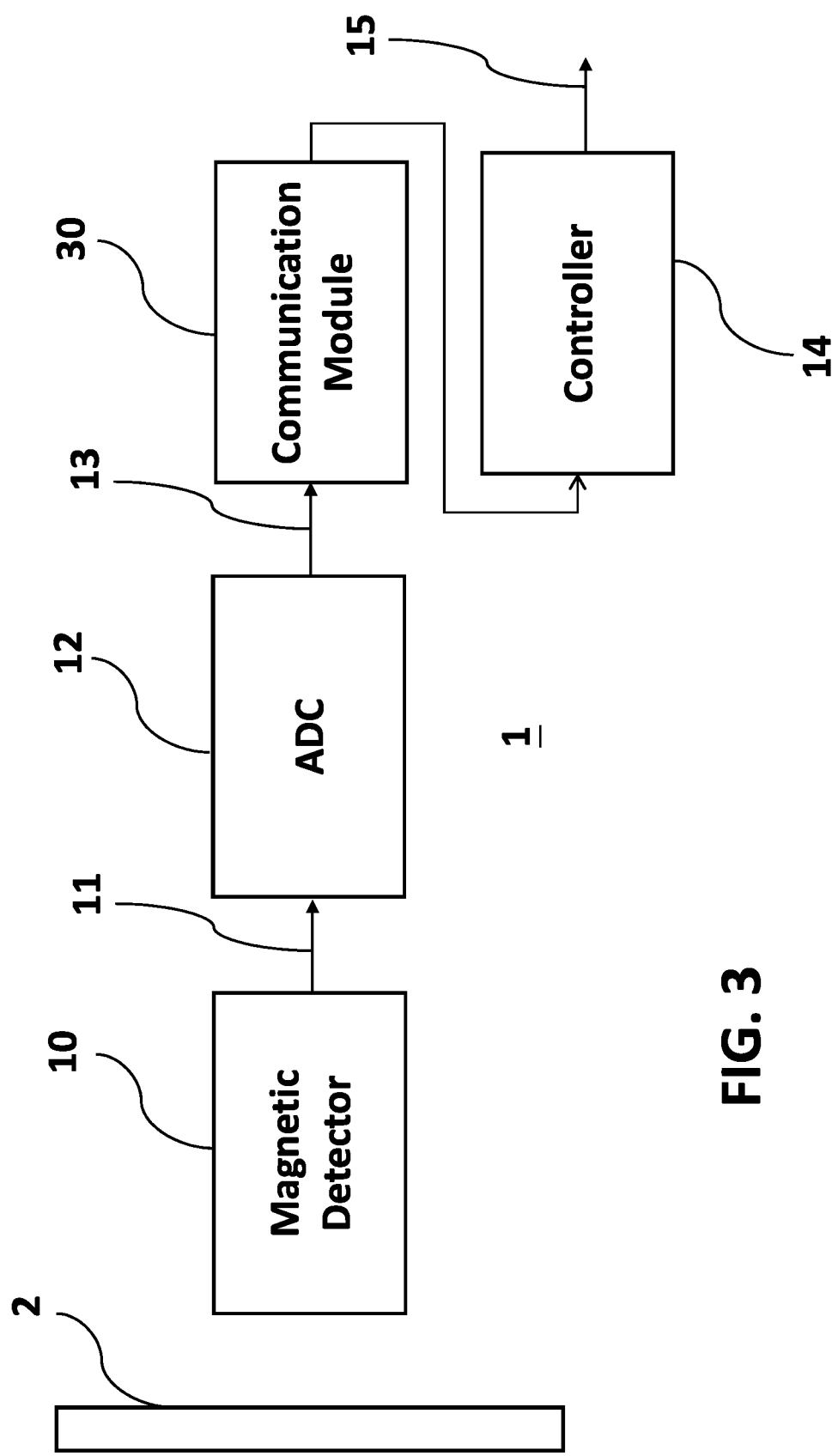
FIG. 3 is a block diagram of a sensor for sensing a usage status of an electrical device according to another preferred embodiment.

FIG. 3 shows a block diagram of a sensor for sensing a usage status of an electrical device according to another preferred embodiment of the disclosure. As shown, a communication module 30 is disposed between the ADC 12 and the controller 14. The communication module 30 is employed to transmit the digital signal 13 to the controller 14 for further processing. Preferably, the communication module 30 should be in compliance with telecommunication standards such as WiFi, Bluetooth, Zigbee or the like.

Although induced magnetic fields of differently phased currents in a power line no matter having 1, 2, 3 or even more wires counteract one another, the disclosure is aimed to serve a main purpose of sensing a turned on or turned off status of an electrical device rather than detecting an accurate current value of the electrical device. Thus, residual magnetic fields and changes after induced magnetic fields of differently phased currents counteract one another are still sufficient for determining a turn on or turned off status of the electrical device.

It should be noted that, the hardware in FIG. 2 are for illustration purposes, and is one of numerous application examples non-limiting to the scope of the disclosure.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation to encompass all such modifications and similar structures.

What is claimed is:

1. A sensor, disposed in proximity of a power line of an electrical device, for sensing a usage status of the electrical device without contacting the power line; the sensor comprising:

a coil-less magnetic detector, in proximity of, but contactless toward, the power line, detecting a magnetic field change, but not a real magnetic field, around the power line to correspondingly generate an analog signal, wherein the coil-less magnetic detector is selected from the group consisting of a magneto-impedance sensor, a magneto-resistance sensor, a giant magneto-resistance sensor and a Hall sensor;
an analog-to-digital converter (ADC), receiving the analog signal and converting the analog signal to a digital signal; and
a controller, receiving the digital signal and generating an indication signal to accordingly learn at least one of statuses of being turned on and turned off the electrical device.

2. The sensor as claimed in claim 1, disposed in a magnetic ring structure, the magnetic ring structure comprising an anti-magnetic interference outer cover, in which the coil-less magnetic detector and a part of the power line are enveloped.

3. The sensor as claimed in claim 2, further comprising a signal collection board disposed in proximity of the coil-less magnetic detector.

4. The sensor as claimed in claim 3, wherein the ADC and the controller are disposed in proximity of the signal collection board.

5. The sensor as claimed in claim 2, further comprising a communication module disposed outside the outer cover and adapted to receive the indication signal.

6. The sensor as claimed in claim 1, further comprising a communication module for transmitting the digital signal to the controller for further processing.

7. A sensing method, adapted for a sensor, the sensor disposed in proximity of a power line of an electrical device, for sensing a usage status of the electrical device without contacting the power line, comprising a coil-less magnetic detector, an analog-to-digital converter (DAC) and a controller; the sensing method comprising:
disposing the coil-less magnetic detector in proximity of, but contactless toward, the power line to detect a magnetic field change, but not a real magnetic field, around the power line and to accordingly generate an analog signal, wherein the coil-less magnetic detector is selected from the group consisting of a magneto-impedance sensor, a magneto-resistance sensor, a giant magneto-resistance sensor and a Hall sensor;
receiving the analog signal and converting the analog signal to a digital signal by the ADC; and
receiving the digital signal and generating an indication signal by the controller to accordingly learn at least one of statuses of being turned on and turned off the electrical device.

8. The sensing method as claimed in claim 7, further comprising being implemented by a magnetic ring structure, the magnetic ring structure comprising an anti-magnetic interference outer cover, in which the coil-less magnetic detector and a part of the power line are enveloped.

9. The sensing method as claimed in claim 8, further comprising disposing a signal collection board, such that the coil-less magnetic detector is disposed in proximity of the signal collection board.

10. The sensing method as claimed in claim 9, further comprising disposing the ADC and the controller in proximity of the signal collection board.

11. The sensing method as claimed in claim 8, further comprising disposing a communication module outside the outer cover to receive the indication signal.

12. The sensing method as claimed in claim 7, further comprising disposing a communication module for transmitting the digital signal to the controller for further processing.

13. A sensor, disposed in proximity of a power line of an electrical device, for sensing a usage status of the electrical device; the sensor comprising:
a coil-less magnetic detector, in proximity of, but contactless toward, the power line, detecting a magnetic field change, but not a real magnetic field, around the power line to correspondingly generate an analog signal, wherein the coil-less magnetic detector is selected from the group consisting of a magneto-impedance sensor, a magneto-resistance sensor, a giant magneto-resistance sensor and a Hall sensor;
an analog-to-digital converter (ADC), receiving the analog signal and converting the analog signal to a digital signal;
a controller, receiving the digital signal and generating an indication signal to accordingly learn at least one of statuses of being turned on and turned off the electrical device; and
a signal collection board disposed in proximity of the coil-less magnetic detector, the signal collection board formed by a high-permeability material.

14. The sensor as claimed in claim 13, wherein the signal collection board formed by ferrite.

15. The sensor as claimed in claim 13, wherein the coil-less magnetic detector, the analog-to-digital converter and the controller are embedded into the signal collection board.

* * * * *